United States Patent [19]

Talenti

[11] 4,111,160

[45] Sep. 5, 1978

[54] METHOD AND APPARATUS FOR OPERATING COMBUSTION ENGINES

[76] Inventor: Pier F. Talenti, 2100 Massachusetts Ave. NW., Washington, D.C. 20008

[21] Appl. No.: 787,651

[22] Filed: Apr. 14, 1977

Related U.S. Application Data

[63] Continuation-in-part of Ser. No. 677,119, Apr. 16, 1976, abandoned, and a continuation-in-part of Ser. No. 734,475, Oct. 29, 1976, abandoned.

[51] Int. Cl.² .............................................. F02B 43/08
[52] U.S. Cl. ................................ 123/1 A; 123/119 E; 123/DIG. 12
[58] Field of Search ...... 123/1 A, 3, 119 E, DIG. 12; 204/DIG. 6, 129, 278

[56] References Cited

U.S. PATENT DOCUMENTS

| | | | |
|---|---|---|---|
| 1,380,183 | 5/1921 | Boisen | 123/DIG. 12 |
| 3,311,097 | 3/1967 | Mittelstaedt | 123/119 E |
| 3,459,953 | 8/1969 | Hughes | 123/119 E |
| 3,648,668 | 3/1972 | Pacheo | 123/119 E |
| 3,939,806 | 2/1976 | Bradley | 123/119 E |

*Primary Examiner*—Charles J. Myhre
*Assistant Examiner*—Craig R. Feinberg
*Attorney, Agent, or Firm*—John J. Byrne; Edward E. Dyson

[57] ABSTRACT

A process and mechanism for producing hydrogen by electrolysis aboard a vehicle, means for controlling the hydrogen thereby produced, and operating an internal combustion engine with trace amounts of the hydrogen, air and a vehicle-carried hydrocarbon fuel whereby the traces of hydrogen maximize full savings in fuel and reduce pollutants and wherein a triangularly-shaped, separator within a hydrogen oxygen producer reduces costs and increases efficiency. The invention herein exhausts the oxygen to atmosphere with beneficient consequences and utilizes a small amount of hydrogen to enhance the qualities of a hydrocarbon fuel.

7 Claims, 2 Drawing Figures

METHOD AND APPARATUS FOR OPERATING COMBUSTION ENGINES

CROSS-REFERENCES TO REIATED APPLICATIONS

This application is a continuation-in-part of patent applications Ser. No. 677,119 filed Apr. 14, 1976, and 734,475 filed Oct. 29, 1976, which are now abandoned.

BACKGROUND OF THE INVENTION

Many workers in the prior art have attempted to generate hydrogen and/or oxygen for use with an internal combustion engine. United States Patents Nos. 1,379,007 (Blumenburg); 1,520,772 (Ricardo); 3,648,668 (Pacheco); and 3,653,364 (Bogan) are all exemplary of efforts made in this direction. The United States Patent to Boisen 1,380,183 of May 31, 1921, is a teaching of an early effort to generate oxygen and hydrogen and use both gases to fuel an engine. Boisen also uses separate tanks in which to create a back pressure to force the electrolyte away from both the cathode and the anode to proceed for a stop and start of the decomposing process automatically. Boisen is a three-compartment unit utilizing the hydrogen and oxygen. Many workers in the art, however, believe the presence of storage tanks such as 11 and 12 for the hydrogen and oxygen of Boisen and the subsequent mixing of these fuels, presents a highly dangerous environment. The United States patent to Jack H. Rupe No. 3,906,913 (1975) also teaches the mixing of hydrogen, air and a liquid hydrocarbon fuel. The patent is particularly useful in its description of the prior art and its disclosure of the degree of work some workers in the prior art did to secure proper levels of hydrogen. Another patent of interest is the United States patent to Marc S. Newkirk, et al. 3,710,770, of June 16, 1973. Newkirk discloses a means of providing hydrogen from a cryogenic supply.

A principal objective of this invention is to provide a rugged producer of hydrogen gas for an internal combustion machine having a pair of compartments with anodes and cathodes therein. The invention includes a means for causing a back pressure against the level of electrolyte in said cathode compartment to lower the level of electrolyte therein and thereby reduce the surface area available for the production of hydrogen. In this manner, the necessity for separate storage tanks or vessels is eliminated.

Another principal objective of this invention is to provide a rugged, uncomplex, two-compartment reactor for developing adjustable amounts of hydrogen. The reactor eliminates the necessity of storing any dangerous amounts of hydrogen in the system without a requirement for complicated valving and measuring systems. Except for the small amount of hydrogen necessary to build a back-pressure for adjustability, the hydrogen is used as it is produced.

An important object of the present invention is to provide a hydrogen reactor for economically providing on demand the trace amounts of hydrogen necessary to operate an internal combustion engine with a mixture of said hydrogen, air and a hydrocarbon-type fuel.

A still further important objective of the invention is to provide a hydrogen generator having a triangular-shaped electrode the surface, so that the incremental amount of active surface area exposed or covered by each successive incremental fall or rise in the electrolyte is smaller or larger, respectively, than the incremental amount of active surface area exposed or covered by the previous incremental fall or rise in accordance with the demands from the engine. The generator is also equipped with a separator that divides the generator into an electrode chamber and an anode chamber. The divider is of a composition that substantially limits the flow of electrolyte between chambers but which transmits electrons therebetween.

Another important objective of this invention is to provide an internal combustion engine which, because of superior burning caused by the hydrogen, permits the ignition timing to be advanced from that in conventional ignition systems.

Another principal objective of the invention is to improve the quality of the atmosphere, especially in areas where large numbers of vehicles are used by releasing substantial amounts of oxygen into the atmosphere.

A still further objective of the invention is to provide a fuel generator and mixture system which is readily adapted for use with all engines and of particular usefulness with burners of gas turbine engines and pre-compression chambers of two-stroke motors.

The present invention relates to a process for operating an internal combustion engine with a mixture of hydrogen, air and a hydrocarbon fuel, comprising the step of producing and introducing trace amounts of hydrogen into a carburetor together with said hydrocarbon fuel and air in adjustable amounts dependent on the hydrogen requirements of the engine.

It is well known in the art to mix hydrogen with a mixture of gasoline vapor and air produced in the carburetors of internal combustion engines to enhance the efficiency of such engines. It is also known that a better and more complete oxidation of the fuel in the combustion chamber of the internal combustion engine can be obtained, when said engine is operated with a lean air-fuel mixture. This has, however, the drawback that for conventional hydrocarbon type fuels the combustion of weak mixtures, i.e., of mixtures having a proportion of air significantly larger than that corresponding to the stoichiometric fuel/air ratio, may lead to misfire, uncontrolled combustion and possibly breakdown of the engine. On the other hand, a very weak mixture of hydrogen and of air is easily ignited. Excellent inflammability is characteristic for a hydrocarbon-fuel/trace amounts of hydrogen/air mixture. When such a mixture is ignited by means of the spark plug, the hydrogen which distributes itself throughout the mixture burns first and contributes to an optimum combustion of the remaining vaporized fuel.

By using the aforementioned principles, it is possible to enlarge the ignition range of the engine and to burn mixtures having a high proportion of air. The temperature of the combustion is lower due to the additional air. Heat losses are accordingly reduced. Such a nearly perfect combustion in combination with high compression ratios improves the economy of the engine, reduces the production of harmful exhaust gases and delays the accumulation of soot in the combustion chamber of the engine. Taking advantage of these known principles has been difficult because no appropriate device has been available for producing and for carrying hydrogen for mobile internal combustion engines. Taking along heavy pressure bottles for hydrogen gas is not convenient, because such bottles must be filled up or exchanged quite frequently. In addition, such pressure bottles present the danger of explosion. Another possibility, the stocking of liquefied hydrogen at low temperatures is troublesome, expensive and dangerous, especially for mobile use.

In the process for operating an internal combustion engine, according to the present invention, hydrogen is produced by electrolytic decomposition of water in a hydrogen reactor, electric current is supplied to said hydrogen generator by means of an alternator, and the hydrogen generator reactor automatically adjusts its hydrogen production to the requirements of the engine. According to the present invention, the automatic adjustment of the hydrogen production rate of said hydrogen generator to the needs of the internal combustion engine is accomplished by causing hydrogen collected between the carburetor and the reactor to exert a pressure on the level of the electrolyte in such a manner that the electrolyte level is lifted or lowered in accordance with the hydrogen pressure of the hydrogen reactor, whereby the surface area of the cathode plates in the electrolyte is adjusted. In this manner, the level of the electrolyte is caused to drop in the cathode compartment when the hydrogen pressure in the hydrogen generator reaches a predetermined magnitude. The electric current of the hydrogen generator is thus automatically lowered and the production of hydrogen in the hydrogen generator is reduced. The hydrogen reactor and its plates are triangularly shaped to increase the sensitivity of the reactor to fuel demands.

The present invention comprises a self-controlling hydrogen reactor operating according to an electrolytic type process, and a DC generator for supplying current to said hydrogen generator. The current generator for supplying current to said hydrogen generator is driven by the engine of the mobile unit.

These and other objects of the invention will become more apparent to those skilled in the art by reference to the following detailed description when viewed in light of the accompanying drawings wherein.

Figure 1:
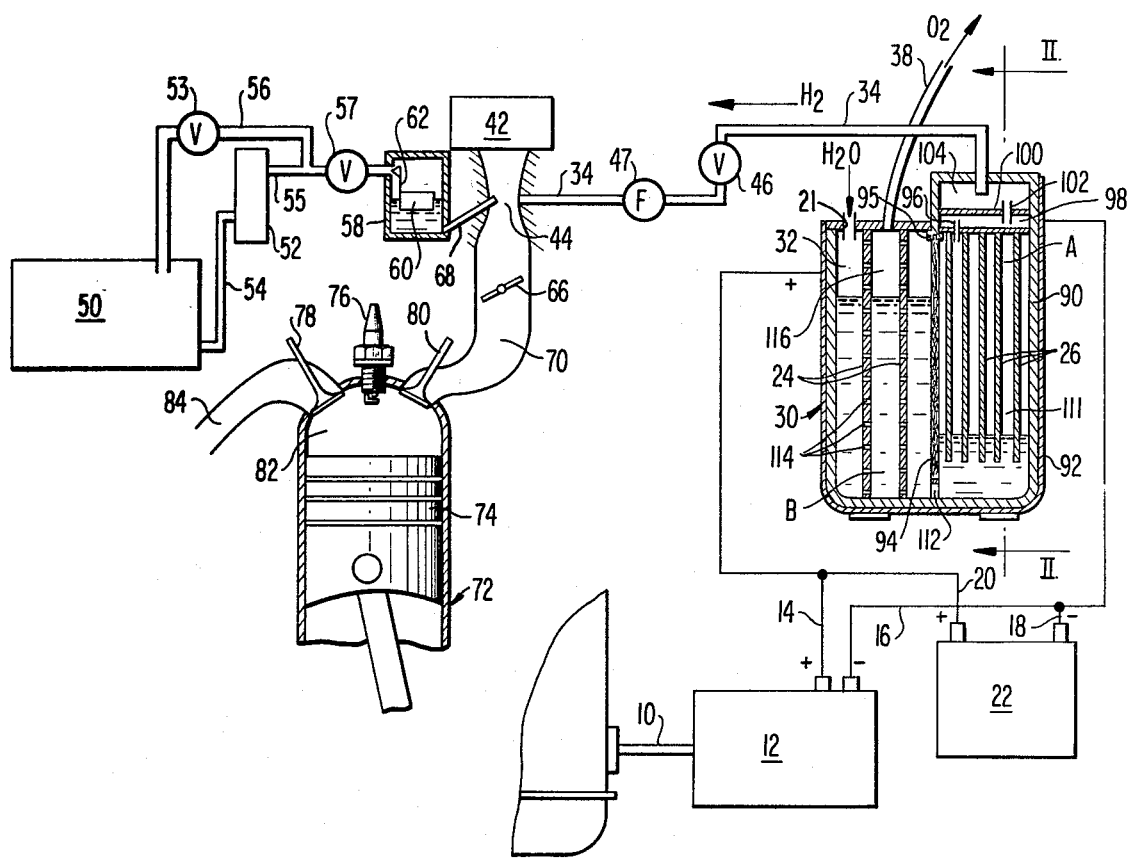
FIG. 1 is a schematic view of a drive plant for mounting in a vehicle.

Referring now to the drawings wherein like elements are referred to by like numerals, the numeral 10 indicates the drive shaft of an automobile engine (not shown) of a type which this invention is uniquely adapted to render more efficient. As is conventional in vehicles of this type, the rotation of a drive shaft 10 energizes a generator 12. Generator 12 has a positive output line 14 and a negative output line 16. Connected in parallel across the input and output lines 14 and 16, respectively, are lines 18 and 20 which are respectively connected to the negative and positive terminals of a battery 22. The generator 12 is of a type that produces Direct Current.

Electrical conduits 14 and 16 are respectively connected to anodes 24 and cathodes 26 of a hydrogen-oxygen generator cell or reactor 30. In FIG. 1, the cell 30 is shown in lateral cross-section and is shown in horizontal cross-section in FIG. 2. The reactor 30 is comprised of a casing 32 having a hydrogen conduit 34 communicating with a cathode chamber A. An oxygen release conduit 38 is in communication with the anode chamber B. The conduit 38 exhausts $O_2$ to the atmosphere where it is conducive to a high quality air.

An air filter intake mechanism is generally indicated by the numeral 42. The air filtered by unit 42 exhausts through a venturi section 44, to which the hydrogen conduit 34 is communicated. Disposed between the venturi section 44 and the chamber A, along conduit 34, is a valve or adjustable orifice 46 and a filter 47.

The principal liquid fuel for the vehicle, normally a hydrocarbon, is stored in a fuel or gasoline tank 50. Fuel is caused to flow from the tank 50 to the carburetor assembly by way of a fuel pump 52 disposed along a fuel conduit 54. A fuel return line 56 communicates the output side of fuel pump 52 back to tank 50 through a pressure reducing valve 53. An output conduit from fuel pump 52 is indicated by the numeral 55 and leads to a float assembly 58 through a valve 57. The float assembly 58 is of a conventional type having a housing in which a float 60 carries a valve member 62 which closes input line 55 from the fuel pump when an appropriate level of fuel is in housing 58.

A hollow stem or pick-up tube 68 communicates the lower portion of float member 58 to the venturi section. Tube 68 has an end disposed within the venturi section 44. A throttle butterfly valve 66 is mounted across the lower part of the venturi section 44 in conventional fashion. As air is drawn through the air intake 42 by virtue of the vacuum caused during position intake strokes, the moving air in the venturi causes a selected amount of hydrocarbon fuel to be drawn through the tube 68 and a selected amount of hydrogen to be drawn from line 34.

An appropriate mixture of air, gasoline and hydrogen flows to intake manifold 70. One of the cylinders 72 of the engine receives a reciprocating piston 74 and is equipped with a spark plug 76 and poppet valves 78 and 80 which function in the standard fashion.

Within the piston firing chamber 82 the gasified hydrogen, liquid fuel, and air are ignited. Even though only traces of hydrogen on the order of .4% to 2% are present, complete burning of the fuel takes place. Because of the complete burning, the products of combustion, substantially non-polluting, are exhausted via the pipe 84.

As can be seen from the system of FIG. 1, precise amounts of hydrogen are delivered to the system under the control of valve 46. This valve can be adjusted by either manual control from the vehicle operator or automatically by way of a monitoring device (not shown) which analyzes the products of combustion in exhaust pipe 84.

Figure 2:
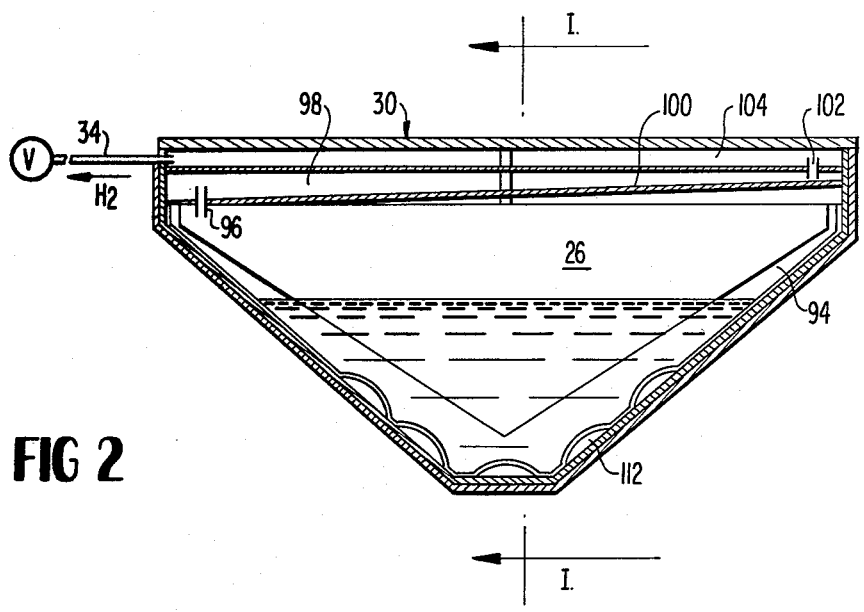
FIG. 2 is a sectional view taken along section line II—II of FIG. 1, of the hydrogen generator of said apparatus of FIG. 1.

It is one of the principal objectives of this invention to produce and deliver only that amount of hydrogen necessary to obtain the objectives of full combustion. Because of the danger of stored hydrogen, the reactor must be sensitive and only produce sufficient amounts of hydrogen to maximize combustion at the speed and load under which the engine is laboring. In FIG. 2 there is shown a cross-section of the hydrogen and oxygen reactor which meets these needs.

The hydrogen generator 30 functions according to the conventional electrolytic water decomposition process according to the formula $2H_2O \rightarrow O_2 + 2H_2$, the direct current for the electrolysis being supplied by the generator 12. The car battery 22 is provided to provide current in the starting phase of the vehicle engine and is otherwise not necessary for the hydrogen production process. Oxygen produced in the course of the electrolysis is exhausted through the exhaust opening 38 to the atmosphere. Alternatively, oxygen produced in the course of the electrolysis can be collected and, under prevention of explosion risks, separately fed to the engine. The hydrogen generator 30, is illustrated in FIGS. 1 and 2. The generator is a closed design and is comprised of a metal electrolytic cell casing 90 having an isolating layer 92 on the outside thereof.

A separator 94 divides the cell 30 into two compartments A and B. The separator is carried by a framework 95. Parallel cathode plates 26 are connected to the negative current conductor. The iron cathode plate 26 are located in compartment A. Cell 30 is preferably made of noncorrosive steel. A substantial portion of the current flow between the electrodes and the anodes takes place directly through the separator 94 to thus reduce the distance the current must travel which, in turn, results in energy savings. Separators of asbestos and metal cast in plastic have been used for this purpose. When asbestos is used, the porosity of the asbestos causes a wetness therethrough sufficient to pass current. When the metallic powder is used, a sufficient percentage thereof is used to efficiently pass current through the separator.

The electrolyte employed can be a 20 — 30% aqueous solution of KOH. To compensate decomposition, water, e.g. distilled or salt-free water, can be added through opening 21 of cell 30. A window, which is not shown in the drawing, can be provided on the outside of the cell 30 for allowing inspection of the electrolyte level in the cell 30. During tests, the hydrogen generator 30 reached its maximum efficiency with an electrolyte comprising 28% KOH. Owing to the large capacity of the cell 30, no drawbacks have been observed, when using tap water instead of distilled water to refill the cell 30. It is even presumed that simultaneously separated gaseous chlorine and fluorine improve the combustion process.

The anode plates 24 are preferably of iron or of nickel, the main parameters for determining the output of the hydrogen generator 30 being the totality of the electrode surfaces of the cathode and the anode available for the current flow and the distance between the electrode plates.

The hydrogen separated at the cathodes 26 passes through an opening 96 into a chamber 98 comprising an inclined bottom 100 and subsequently through an opening 102 into a collecting chamber 104, from where it passes via pipe 34 and valve 46 to the venturi section 44. As stated above, oxygen separated at the anodes 24 is exhausted via conduit 38 to the atmosphere.

In FIG. 2 it can be seen that the reactor casing in longitudinal cross-section is triangular. The cathodes 26 and the anodes 24 are also of triangular shape. The triangular shape of the cathodes has an important relationship with respect to the level of the electrolyte. Because of the rapidly increasing surface area available for hydrogen production of the cathodes as the electrolyte level is raised in chamber A and the rapid decrease in surface area as the electrolytic level is lowered in chamber A, the unit is extremely sensitive to engine demands.

In operation, the suction stroke of the engine creates a vacuum or negative pressure in the intake manifold of the carburetor which causes hydrogen to flow via conduit 34 into the carburetor. Through suitable adjustment of the valve 46 and/or an appropriate choice of the dimensions of the conduit 34, the flow of hydrogen to the engine is regulated to continuously match the needs of the engine. A fine adjustment or regulation of the hydrogen production rate occurs automatically in the hydrogen generator 30. In cause of overproduction of hydrogen in the generator 30, a higher hydrogen pressure is created in the gas-filled space 111 of chamber A. This positive pressure lowers the level of the electrolyte in such a manner that the electrolyte escapes through openings 112 of separator 94 and through the openings 114 of the anode plates 24 into the free space 116, exposed to the atmospheric pressure, which surrounds the tops of anodes 24, whereby the wetted conductive surface portions of the cathode plates 26 and consequently the hydrogen production rate of the generator 30 are reduced in such a manner that the hydrogen production of the generator 30 and the hydrogen consumption of the engine balance each other out.

If the conduit 34 is clogged or the valve 46 is closed, the level of the electrolyte sinks beneath the cathode plates 26.

Chambers 98 and 104 form preliminary filters for separating fluid droplets mixed to the gaseous hydrogen produced in cell 30. The separated fluid flows back again in the cell along the inclined bottom 100 of the chamber 98. A further filter 47 is preferably provided in the conduit 34 for preventing corrosive fluids from passing into the engine 1.

Since the alternator is coupled directly to the engine, less current, and therefore less hydrogen, is produced at relatively low revolution rates of the engine, so as to furnish a further automatic control of the hydrogen production.

It can be seen that the two-compartment cell 30 with a conductive separator 94 provides a greatly reduced travel for current flow between the anodes and cathodes which results in energy savings in the system.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

I claim:

1. In an internal combustion engine having a carburetor, a gas generator cell adapted to receive an electrolytic solution and manifold means between said carburetor and said gas generator, the improvement comprising:
   a separator dividing said cell into first and second compartments and having an opening therethrough providing communication between said compartments,
   at least one cathode plate supported in said first compartment and shaped so that the incremental amount of active surface area exposed to the electrolyte by each successive incremental rise in the electrolyte in said first compartment is larger than the incremental amount of active surface area exposed to the electrolyte by the previous incremental rise in the electrolyte in said first compartment,
   at least one anode plate disposed in said second compartment,
   first means for applying an electric current to the circuit comprised of said anode plate, said cathode plate, and the electrolytic solution, to thereby produce hydrogen in said first compartment, and
   second means to carry said hydrogen to said manifold means,
whereby when a back pressure is built in said manifold means and first compartment due to a production of hydrogen, the level of electrolyte in said first compartment is lowered and the surface area of said cathode plates exposed to said electrolyte is reduced to thereby reduce the production of hydrogen.

2. The invention of claim 1 wherein said cathode plate is triangularly shaped having its base disposed in the upper portion of said first compartment and tapering to an apex in the lower portion of said first compartment.

3. The invention of claim 1 wherein said separator is conductive.

4. The invention of claim 3 wherein said separator is made from a metal and plastic composition.

5. The invention of claim 1 wherein said separator plate is at least partially porous.

6. The invention of claim 5 wherein said porous area of said separator plate is of an asbestos composition.

7. The invention of claim 5 wherein the degree of said porosity is sufficient to pass current when wet but to restrict the flow of electrolyte therethrough.

* * * * *